United States Patent [19]

Ochiai

[11] Patent Number: 4,744,342
[45] Date of Patent: May 17, 1988

[54] INTAKE PORT STRUCTURE FOR AN INTERNAL COMBUSTION ENGINE

[75] Inventor: Katsumi Ochiai, Mitaka, Japan

[73] Assignee: Fuji Jukogyo Kabushiki Kaisha, Tokyo, Japan

[21] Appl. No.: 64

[22] Filed: Jan. 2, 1987

[30] Foreign Application Priority Data

Jan. 8, 1986 [JP] Japan .................................. 61-1776

[51] Int. Cl.⁴ ............................................. F02B 31/00
[52] U.S. Cl. ................................ 123/308; 123/188 M
[58] Field of Search ............................ 123/188 M, 308

[56] References Cited

U.S. PATENT DOCUMENTS 3,411,490 11/1968 Akana ............................ 123/188 M
3,903,849 9/1975 List et al. ....................... 123/188 M Primary Examiner—E. Rollins Cross
Attorney, Agent, or Firm—Martin A. Farber

[57] ABSTRACT

An internal combustion engine has a cylinder head and at least two cylinders. Two intake valves are provided for each cylinder. A siamese intake port comprising a common port, a helical port and straight port is formed in the cylinder head. The helical port is communicated with one of the intake valves of one of the cylinders, and the straight port is communicated with one of the intake valves of the other cylinder.

4 Claims, 3 Drawing Sheets

INTAKE PORT STRUCTURE FOR AN INTERNAL COMBUSTION ENGINE

BACKGROUND OF THE INVENTION

The present invention relates to an intake port structure for an internal combustion engine having multiple cylinders, and more particularly to an intake port structure for improving a mixture of air with fuel.

Generally, in order to mix the air and the fuel for improving combustion efficiency, it is effective to produce a swirl of air-fuel mixture in a combustion chamber. There has been proposed to provide a cylinder head having two intake valves for one cylinder. For example, Japanese Patent Application Laid Open No. 58-160513 discloses a cylinder head having two intake ports in which a primary intake port is formed in a helical port and a secondary intake port is formed in a straight port. The length of the primary helical port is longer than that of the secondary straight port. Japanese Utility Model Application Laid Open No. 55-44004 discloses a cylinder head wherein a low-load intake port is bifurcated for adjacent cylinders. A diffuser is provided on an intake valve seat so as to generate a swirl.

However, since both the primary and secondary intake ports in the former prior art are connected to the same cylinder, the incoming air-fuel mixture flows separately into the cylinder through two intake ports. Thus, a strong swirl can not be generated in such a system.

The structure of the latter prior art is complicated because of providing the diffuser in the cylinder.

SUMMARY OF THE INVENTION

An object of the present invention is to provide an intake port structure of a multi-cylinder internal combustion engine for producing an effective swirl of air-fuel mixture in a combustion chamber.

Another object of the present invention is to provide an intake port of the internal combustion engine which may improve a combustion process in a low engine speed range and fuel consumption and provide an engine having high power at low cost.

According to the present invention, there is provided an intake port structure for an internal combustion engine having a cylinder head and at least two cylinders comprising, at least two intake valves provided for each cylinder, the cylinder head having two independent intake ports, and a siamese intake port comprising a common port, a second helical port and a first straight port. The straight port is disposed in a tangential direction of one of the cylinders and communicated with one of the intake valves of the cylinder, and the helical port is disposed in a tangential direction of the other cylinder and communicated with one of the intake valves of the other cylinder. One of the independent intake ports has a first helical port, communicated with the other intake valve of the cylinder having the first straight port, and the other independent intake port has a second straight port, communicated with the other intake valve of the cylinder having the second helical port.

The other objects and features of this invention will be apparently understood from the following description with reference to the accompanying drawings.

DETAILED DESCRIPTION OF THE PREFERRED EMBODIMENT

Figure 1:
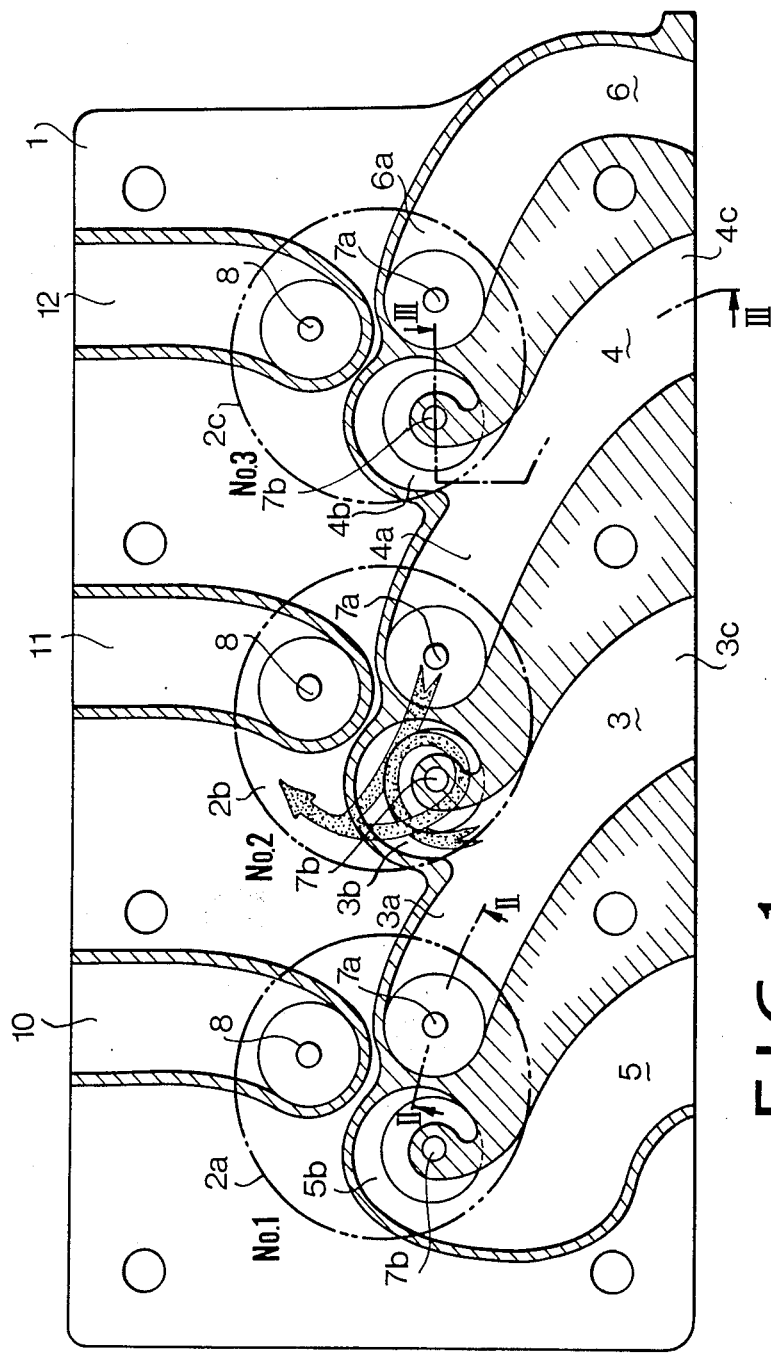
FIG. 1 is a sectional plan view of a cylinder head of an internal combustion engine according to the present invention.
Figure 2:
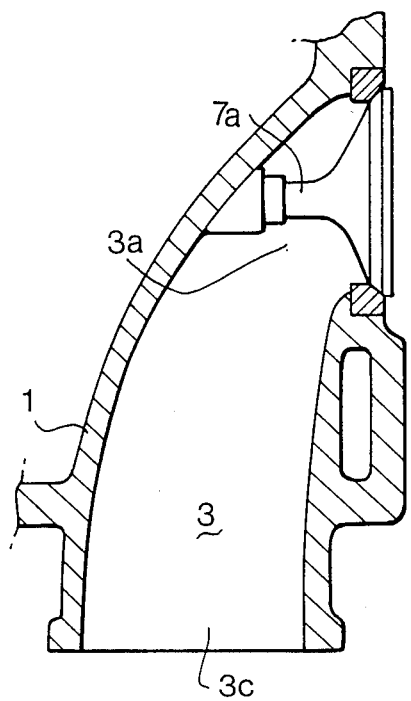
FIG. 2 is a sectional view of an intake port provided in the cylinder head taken along a line II—II of FIG. 1.
Figure 3:
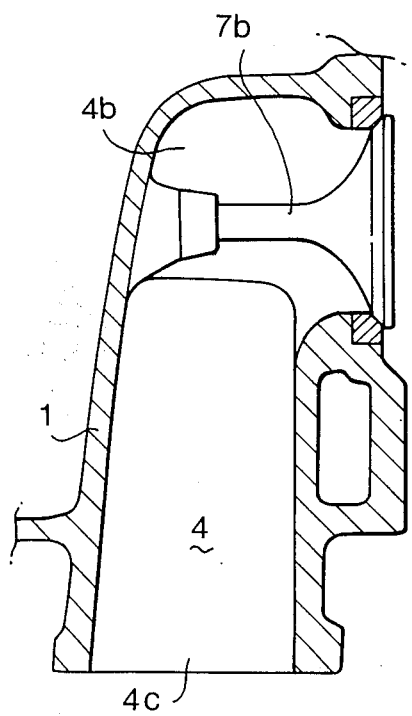
FIG. 3 is a sectional view of another intake port taken along a line III—III of FIG. 1.

Referring to FIGS. 1 to 3 showing a multi-cylinder engine for a vehicle, the engine has three cylinders 2a, 2b and 2c, and a cylinder head 1. In the cylinder head 1, head-siamese intake ports 3 and 4, independent intake ports 5 and 6, and exhaust ports 10, 11 and 12 are formed. Each cylinder 2a, 2b or 2c has two intake valves 7a and 7b, and one exhaust valve 8. Intake valves 7a and 7b are provided in the cylinder 2a (2b, 2c), deflected from the center of the bore of the cylinder.

The siamese intake port 3(4) has a common port, a branch port 3a(4a) and a branch port 3b(4b) formed at a downstream portion thereof. The length from an inlet 3c(4c) to an inlet of the branch port 3b(4b) is smaller than the length between the inlet 3c(4c) and an inlet of the branch port 3a(4a). The intake port 3a is formed in a straight port and communicated with the cylinder 2a through the intake valve 7a. The intake port 3b is formed in a helical port and communicated with the adjacent cylinder 2b through the intake valve 7b. Similarly, the intake port 4a is a straight port for the cylinder 2b, and intake port 4b is a helical port for the adjacent cylinder 2c.

Since the helical port 3b(4b) is positioned in the intake port 3(4) closer to the inlet 3c(4c) than the straight port 3a(4a), the effective length of the helical port is approximately equal to the length of the straight port.

The independent intake port 5 is provided with a helical port 5b which is communicated with the cylinder 2a through the valve 7b. The independent intake port 6 is provided with a straight port 6a communicated with the cylinder 2c through the intake valve 7a.

At each cylinder, straight port 4a is tangentially disposed in the same direction with respect to the cylinder as the helical port.

The operations of the intake ports will be described hereinafter.

Figure 4:
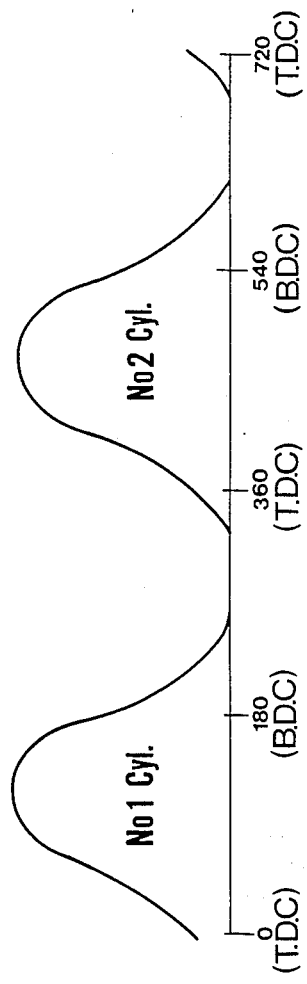
FIGS. 4 and 5 are illustrations of valve timing of intake valves for a two-cylinder engine and a three-cylinder engine, respectively.

FIG. 4 shows an example of an intake valve timing of a two-cylinder engine having the siamese port of the invention. An intake stroke of a No.1 cylinder is completely independent of that of a No.2 cylinder. When one of the valves of the siamese intake port is completely open, the other closes. Thus, the whole amount of air-fuel mixture flows from the opened valve into the cylinder to produce a strong swirl.

Figure 5:
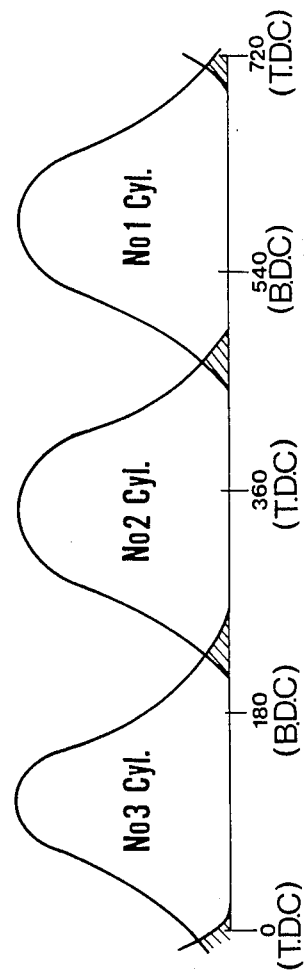

The valve timing of the three-cylinder engine is shown in FIG. 5. When the cylinder 2b (No.2 cylinder) is in the intake stroke, intake valves 7a, 7b of the adjacent cylinders 2a, 2c (No.1 and No.3 cylinders) close. Accordingly, air-fuel mixture from the intake manifold (not shown) enters from inlets 3c and 4c, and flows into intake ports 3 and 4. At this time, since the intake valve 7a of the cylinder 2a is closed, the air-fuel mixture entered into the intake port 3 is delivered to the helical port 3b and flows into the cylinder 2b through the intake valve 7b with a swirl. Since the overlapping period indicated by hatching lines of intake strokes of No.2 and No.3 cylinders is a negligible amount, a strong swirl generates in the No.2 cylinder. The air-fuel mixture in the intake port 4 flows into the straight port 4a and enters into the cylinder 2b in the tangential direction through the intake valve 7a, as the intake valve 7b of the cylinder 2c is closed. Thus, the swirl from the intake valve 7a and the swirl from the intake valve 7b flow together in the cylinder to provide a strong swirl as shown by an arrow in FIG. 1.

In accordance with the present invention, an intake port is bifurcated for two adjacent cylinders, one being formed in a helical port and the other in a straight port. The incoming air-fuel mixtures from the siamese helical port and straight port flow together in the same tangential direction in the cylinder, thereby providing a great swirling effect.

Although the cylinder having a plurality of intake valves has a high EGR rate, fast combustion is performed in a low-speed range, thereby improving fuel consumption.

The present invention is effectively used for an internal combustion engine having two cylinders or three cylinders, since the intake valve timing of a cylinder is not overlapped with that of an adjacent cylinder.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. An intake port structure for an internal combustion engine having a cylinder head, said cylinder head having a first end adjacent a first cylinder, a second cylinder, and the opposite end adjacent a last cylinder, each of said cylinders having a combustion chamber
    at least two intake valves provided for each cylinder;
    the cylinder head having two independent intake ports, and at least one siamese intake port comprising a common port, a second helical port and a first straight port;
    said second helical port being disposed in a tangential direction of said second cylinder and communicated with one of the intake valves of the second cylinder;
    said first straight port being disposed in a tangential direction of said first cylinder and communicated with one of the intake valves of the first cylinder;
    one of the independent intake ports having a first helical port and communicated with the other intake valve of the first cylinder having the first straight port, and the other independent intake port having a second straight port and communicated with one of the intake valves of the last cylinder.

2. The intake port structure according to claim 1 wherein each of the helical ports has a length approximately equal to that of the straight port.

3. The intake port structure according to claim 1 wherein each of the helical ports is disposed closer to an inlet of the common port than the straight port.

4. An intake port structure for an internal combustion engine having a cylinder head, said cylinder head having a first end adjacent a first cylinder, and the opposite end adjacent a last cylinder, each of said cylinders having a combustion chamber, the structure comprising
    at least two intake valves provided for each cylinder;
    the cylinder head having two independent intake ports, and at least one siamese intake port comprising a common port, a second helical port and a first straight port;
    said second helical port of at least one siamese intake port being disposed in a tangential direction of said last cylinder and communicated with one of the intake valves of said last cylinder;
    said first straight port of at least one siamese intake port being disposed in a tangential direction of said first cylinder and communicated with one of the intake valves of the first cylinder;
    one of the independent intake ports having a first helical port communicated with the other intake valve of the first cylinder having the first straight port; and
    the other independent intake port having a second straight port communicated with the other intake valve of the last cylinder.

* * * * *